US012353432B2

(12) United States Patent
Zhang et al.

(10) Patent No.: US 12,353,432 B2
(45) Date of Patent: Jul. 8, 2025

(54) DATA GENERATION PROCESS FOR MULTI-VARIABLE DATA

(71) Applicant: International Business Machines Corporation, Armonk, NY (US)

(72) Inventors: A Peng Zhang, Xian (CN); Si Er Han, Xian (CN); Lei Gao, Xian (CN); Jin Wang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/513,579

(22) Filed: Nov. 19, 2023

(65) Prior Publication Data

US 2025/0165492 A1 May 22, 2025

(51) Int. Cl.
*G06F 16/25* (2019.01)
*G06F 16/22* (2019.01)

(52) U.S. Cl.
CPC .......... *G06F 16/258* (2019.01); *G06F 16/221* (2019.01); *G06F 16/2264* (2019.01)

(58) Field of Classification Search
CPC ... G06F 16/258; G06F 16/221; G06F 16/2264
USPC ......................................................... 707/756
See application file for complete search history.

(56) References Cited

U.S. PATENT DOCUMENTS

| | | | | |
|---|---|---|---|---|
| 7,072,723 B2 * | 7/2006 | Kohn | ................... | G05B 13/024 700/28 |
| 7,129,987 B1 * | 10/2006 | Westwater | ............ | G06T 3/4084 348/E7.012 |
| 8,209,334 B1 * | 6/2012 | Doerner | ................ | G06F 3/0641 707/698 |
| 8,893,131 B2 * | 11/2014 | Ramakrishnan | ...... | G06F 9/5083 709/201 |
| 9,720,939 B1 * | 8/2017 | Andrews | ............. | G06F 16/2465 |
| 9,753,964 B1 * | 9/2017 | Marshall | ........... | G06F 18/24137 |
| 10,366,053 B1 * | 7/2019 | Zheng | .................... | G06N 20/00 |
| 10,713,589 B1 * | 7/2020 | Zarandioon | ........... | G06N 20/00 |
| 10,719,578 B1 * | 7/2020 | Ladde | ..................... | G06F 17/18 |
| 10,838,940 B1 * | 11/2020 | Wu | ..................... | G06F 16/2255 |

(Continued)

FOREIGN PATENT DOCUMENTS

| | | |
|---|---|---|
| CN | 116452261 A | 7/2023 |
| EP | 3839680 A1 | 6/2021 |
| KR | 102425204 B1 | 7/2022 |

OTHER PUBLICATIONS

Unknown, SPSS Modeler IBM, last updated Feb. 3, 2023.

(Continued)

*Primary Examiner* — Hanh B Thai
(74) *Attorney, Agent, or Firm* — Harrity & Harrity, LLP

(57) ABSTRACT

An example operation may include one or more of storing an original data set in memory, splitting the original data set into a subset of continuous-type data values and a subset of discrete-type data values based on variable types in the original data set, converting the subset of continuous-type data values into a second subset of discrete-type data values based on a data binning operation, generating a new subset of continuous-type data values based on the subset of continuous-type data values in the original data set, and combining a subset of discrete-type data values from a conditional contingency table within the new subset of continuous-type data values to generate a new data set.

20 Claims, 12 Drawing Sheets

(56) References Cited

U.S. PATENT DOCUMENTS

| | | | |
|---|---|---|---|
| 11,599,667 B1* | 3/2023 | Tutuianu | G06N 5/04 |
| 12,067,084 B1* | 8/2024 | Smith | G06F 18/2321 |
| 2002/0049720 A1* | 4/2002 | Schmidt | G06F 18/24765 |
| 2004/0250188 A1* | 12/2004 | Aggarwal | G01R 31/318307 |
| | | | 714/738 |
| 2005/0096950 A1 | 5/2005 | Caplan et al. | |
| 2005/0102044 A1* | 5/2005 | Kohn | G06F 17/11 |
| | | | 700/28 |
| 2011/0078168 A1* | 3/2011 | Kenedy | G06F 16/24578 |
| | | | 707/765 |
| 2015/0379428 A1* | 12/2015 | Dirac | G06N 20/00 |
| | | | 706/12 |
| 2015/0379429 A1* | 12/2015 | Lee | G09B 5/00 |
| | | | 706/11 |
| 2015/0379430 A1* | 12/2015 | Dirac | G06N 20/00 |
| | | | 706/12 |
| 2016/0078361 A1* | 3/2016 | Brueckner | H04L 67/10 |
| | | | 706/12 |
| 2016/0358099 A1* | 12/2016 | Sturlaugson | G06N 5/043 |
| 2018/0075175 A1* | 3/2018 | Chang | G06F 17/18 |
| 2018/0203916 A1* | 7/2018 | Rafsky | G06F 16/285 |
| 2018/0300338 A1 | 10/2018 | Gebremariam | |
| 2019/0258743 A1* | 8/2019 | Convertino | G06F 16/90 |
| 2019/0259041 A1* | 8/2019 | Jackson | G06F 16/288 |
| 2019/0370254 A1* | 12/2019 | Maxwell | G06F 16/221 |
| 2020/0192895 A1* | 6/2020 | Hill | G06F 16/287 |
| 2020/0250185 A1* | 8/2020 | Anderson | G06F 16/2358 |
| 2021/0110255 A1* | 4/2021 | Das | G06N 3/047 |
| 2021/0182077 A1* | 6/2021 | Chen | G06Q 30/0241 |
| 2021/0256406 A1* | 8/2021 | Mueller | G06N 7/01 |
| 2022/0180234 A1* | 6/2022 | Kamthe | G06N 7/01 |
| 2022/0374793 A1* | 11/2022 | Jezewski | G06N 5/04 |
| 2022/0414492 A1* | 12/2022 | Jezewski | G06N 5/04 |
| 2022/0414504 A1 | 12/2022 | Xu et al. | |
| 2023/0112576 A1* | 4/2023 | Liu | G06N 3/047 |
| | | | 706/15 |
| 2023/0214690 A1* | 7/2023 | Elser | G06F 30/20 |
| | | | 706/11 |
| 2023/0351202 A1* | 11/2023 | Sakhinana | G06N 3/088 |
| 2024/0020414 A1* | 1/2024 | Burns | G06F 21/6254 |

OTHER PUBLICATIONS

International Searching Authority, "Notification of Transmittal of the International Search Report and the Written Opinion of the International Searching Authority, or Declaration," Patent Cooperation Treaty, Jan. 23, 2025, 15 pages, International Application No.—PCT/EP2024/079554.

\* cited by examiner

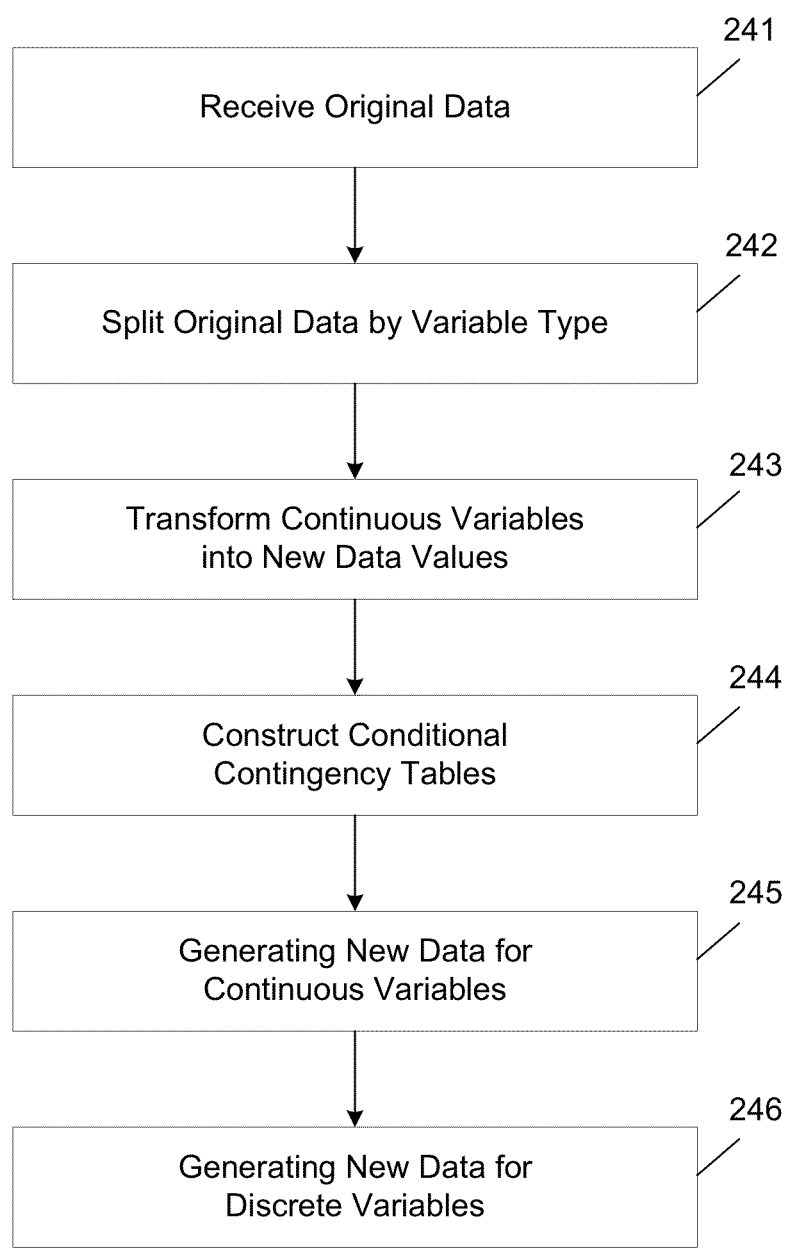

FIG. 3E

Contingency Table # 1

| ID | $X_{d1}$ | ... | $X_{k+1}$ | $X_{k+2}$ | $X_{k+3}$ | Probability |
|---|---|---|---|---|---|---|
| 1 | 100 | ... | k | e | ... | 0.19 |
| 2 | 100 | ... | f | c | ... | 0.12 |
| 3 | 100 | ... | a | b | ... | 0.07 |
| ... | ... | ... | ... | ... | ... | ... |
| N | 100 | ... | m | f | ... | 0.14 |

360
362

300E

| ID | $X_1$ | $X_2$ | $X_3$ | $X_{...}$ | $X_k$ | $X_{k+1}$ | $X_{k+2}$ | $X_{k+3}$ |
|---|---|---|---|---|---|---|---|---|
| 1 | 0.4 | 202 | 352 | ... | 154 | f | c | ... |
| 2 | 24.3 | 11 | 17 | ... | 4 | | | ... |
| 3 | 9.2 | 51 | 5 | ... | 12 | | | ... |
| N | 4.1 | 12 | 55 | ... | 19 | | | ... |

| ID | $X_1$ | $X_2$ | $X_3$ | $X_{...}$ | $X_k$ | $X_{k+1}$ | $X_{k+2}$ | $X_{k+3}$ |
|----|------|------|------|------|------|----------|----------|----------|
| 1  | 0.4  | 202  | 352  | ...  | 154  | f        | c        | ...      |
| 2  | 24.3 | 11   | 17   | ...  | 4    | k        | e        | ...      |
| 3  | 9.2  | 51   | 5    | ...  | 12   |          |          |          |
| N  | 4.1  | 12   | 55   | ...  | 19   |          |          |          |

Contingency Table # 2

| ID | $X_{d1}$ | ... | $X_{k+1}$ | $X_{k+2}$ | $X_{k+3}$ | Probability |
|----|---------|-----|----------|----------|----------|-------------|
| ...| ...     | ... | ...      | ...      | ...      | 0.08        |
| 5  | 8       | ... | b        | f        | ...      | 0.25        |
| 6  | 8       | ... | k        | e        | ...      | 0.16        |
| ...| ...     | ... | ...      | ...      | ...      | ...         |
| N  | 8       | ... | m        | f        | ...      | 0.05        |

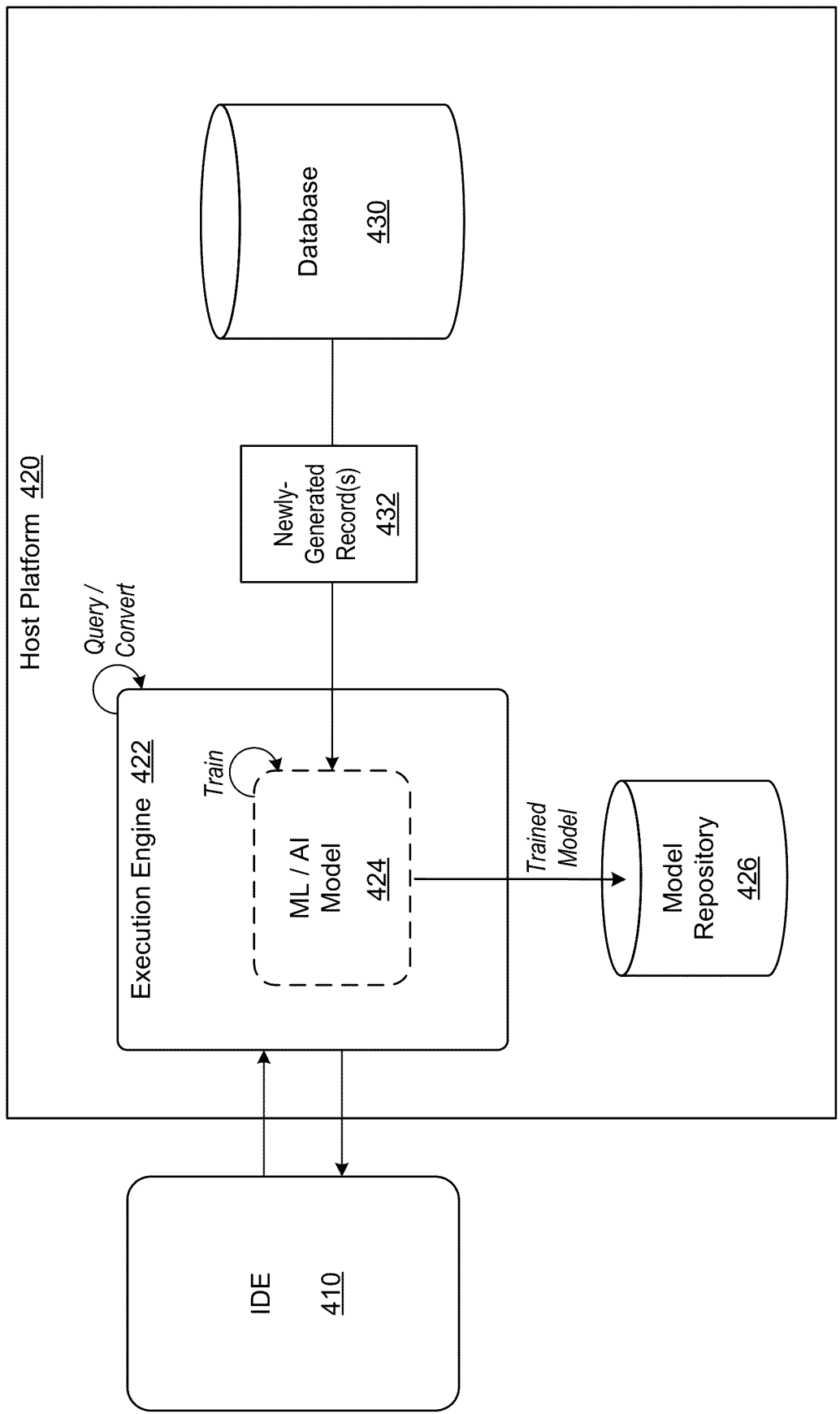

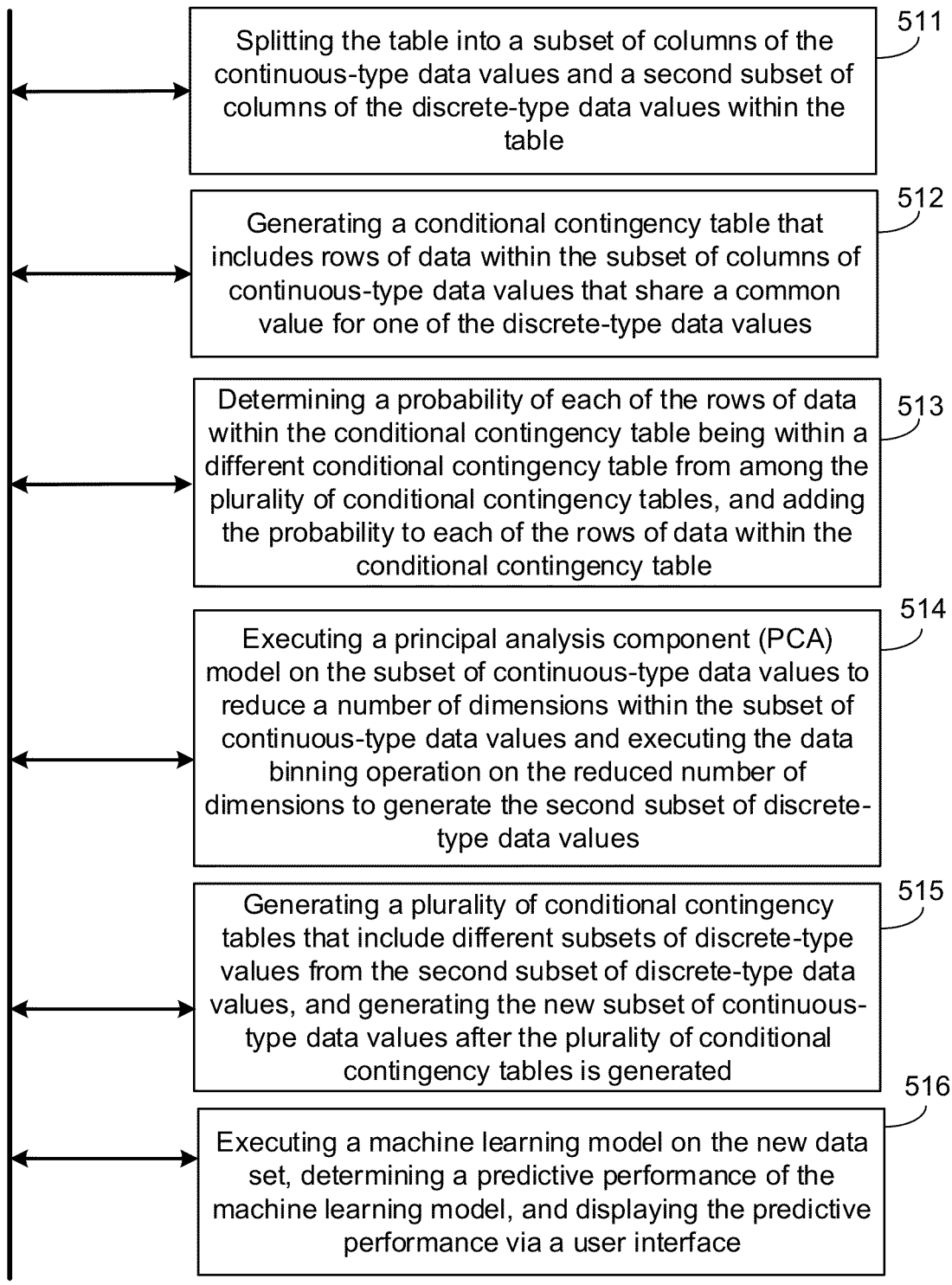

DATA GENERATION PROCESS FOR MULTI-VARIABLE DATA

BACKGROUND

Data generation is the process of creating new data based on characteristics and patterns of existing data, also referred to as original data. Data generation can be used for various purposes, for example, training models, testing models, research, analysis, and the like. Typically, new data is generated by mining patterns of data within the original data and generating a new data set based on the mined pattern of data. However, when the original data set is a complex data set that includes a large number of variables of different types, the likelihood of efficiently generating new data in an accurate manner is low.

SUMMARY

One example embodiment provides an apparatus that may include a memory configured to store an original data set, and a processor configured to split the original data set into a subset of continuous-type data values and a subset of discrete-type data values based on variable types in the original data set, convert the subset of continuous-type data values into a second subset of discrete-type data values based on a data binning operation, generate a new subset of continuous-type data values based on the subset of continuous-type data values in the original data set, and combine a subset of discrete-type data values from a conditional contingency table within the new subset of continuous-type data values to generate a new data set.

Another example embodiment provides a method that includes one or more of storing an original data set in memory, splitting the original data set into a subset of continuous-type data values and a subset of discrete-type data values based on variable types in the original data set, converting the subset of continuous-type data values into a second subset of discrete-type data values based on a data binning operation, generating a new subset of continuous-type data values based on the subset of continuous-type data values in the original data set, and combining a subset of discrete-type data values from a conditional contingency table within the new subset of continuous-type data values to generate a new data set.

A further example embodiment provides a computer-readable medium that includes instructions, that when read by a processor, cause the processor to perform one or more of storing an original data set in memory, splitting the original data set into a subset of continuous-type data values and a subset of discrete-type data values based on variable types in the original data set, converting the subset of continuous-type data values into a second subset of discrete-type data values based on a data binning operation, generating a new subset of continuous-type data values based on the subset of continuous-type data values in the original data set, and combining a subset of discrete-type data values from a conditional contingency table within the new subset of continuous-type data values to generate a new data set.

BRIEF DESCRIPTION OF THE DRAWINGS

FIGS. 2A-2B are diagrams illustrating a process of generating new data for a data set with multiple types of variables according to example embodiments.

FIGS. 3A-3F are diagrams illustrating processes for building contingency tables and using the contingency tables to generate new data according to example embodiments.

FIG. 4 is a diagram illustrating a process of training a model based on newly-generated data according to example embodiments.

FIG. 5B is a diagram illustrating a method of generating new data from multi-variable data according to other example embodiments.

DETAILED DESCRIPTION

Figure 1:
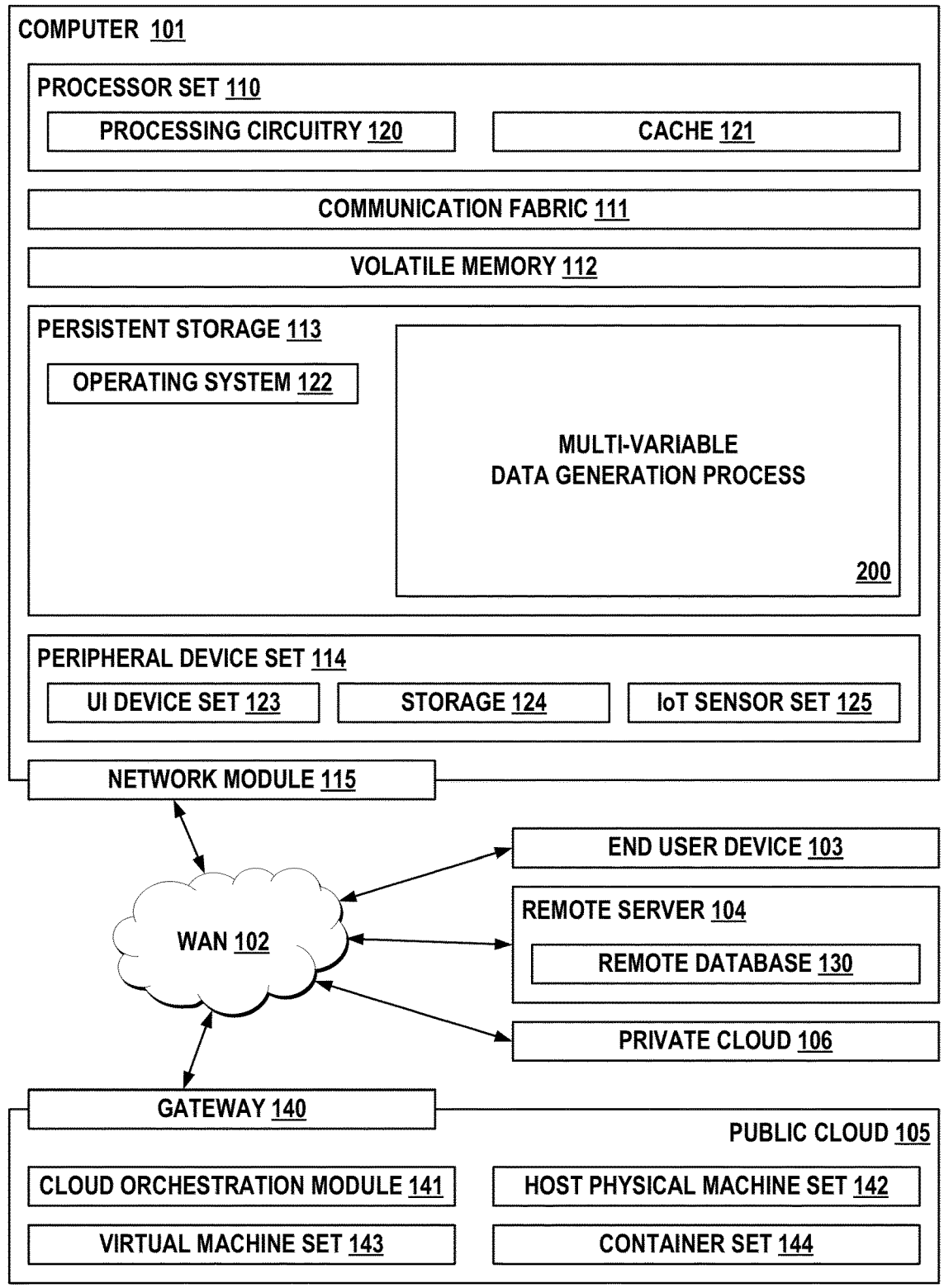
FIG. 1 depicts a computing environment, according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

One of the problems of generating new data via patent mining is that the process usually only focuses on one variable or a small set of variables. Another problem is that some variables may be continuous, and some variables may be discrete which requires different types of data values. The instant solution overcomes these problems.

The example embodiments are directed to a system that generates new data from a data set (e.g., a table, etc.) that mimics the characteristics and patterns of the original data set. In some embodiments, the system may be a software application that is hosted on a cloud platform or other host platform. For example, the system can generate realistic data sets from data sets that include multiple variable types (e.g., discrete, and continuous, etc.) The system may split the original data set into two mutually-exclusive subsets based on data types and build a multi-variable data set from the different subsets.

According to various embodiments, the system may convert the subset of continuous data into discrete data values through a combination of algorithms. The continuous variables (i.e., variables that can take any value within a certain range of values, etc.) may be converted into discrete variables through a process that includes dimension reduction and binning. The binned and reduced continuous variables may then be used to create contingency tables for the discrete data values in the subset of discrete data values. Furthermore, the system may generate a new data set that includes the newly created continuous variables and a newly created subset of discrete variables that are extracted from a contingency table. The resulting new table of data has very similar characteristics and data patterns as the original data set.

Through the process described herein, new training data for input to a model during a training process can be generated from scratch rather than extracted from within historical records or purchased from an external source. Furthermore, the data that is created is very similar to the original data. As a result, the quality of the data remains very similar. The data that is generated can then be used to train a model such as a machine learning model, an artificial intelligence model, or the like. By creating high quality training data, the system enables more accurate models to be trained using such data.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for executing at least some of the computer code involved in performing the inventive methods, such as multi-variable data generation process 200. In addition to the multi-variable data generation process 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the multi-variable data generation process 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the multi-variable data generation process 200 in persistent storage 113.

COMMUNICATION FABRIC 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in the context transferring pipeline 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

In the example embodiments, a host platform such as a cloud platform may have a need to generate new data that mimics an original set of data. As just one example, the data generation process could be used for generating training data for training a model such as a machine learning model, an artificial intelligence (AI) model, or the like. The quality of the training data affects the accuracy of the model. In other words, the better quality the training data, the more accurate the model. To do this, the newly generated data should have patterns and characteristics that match the original data, but with rearranged and/or different values.

Figure 2A:
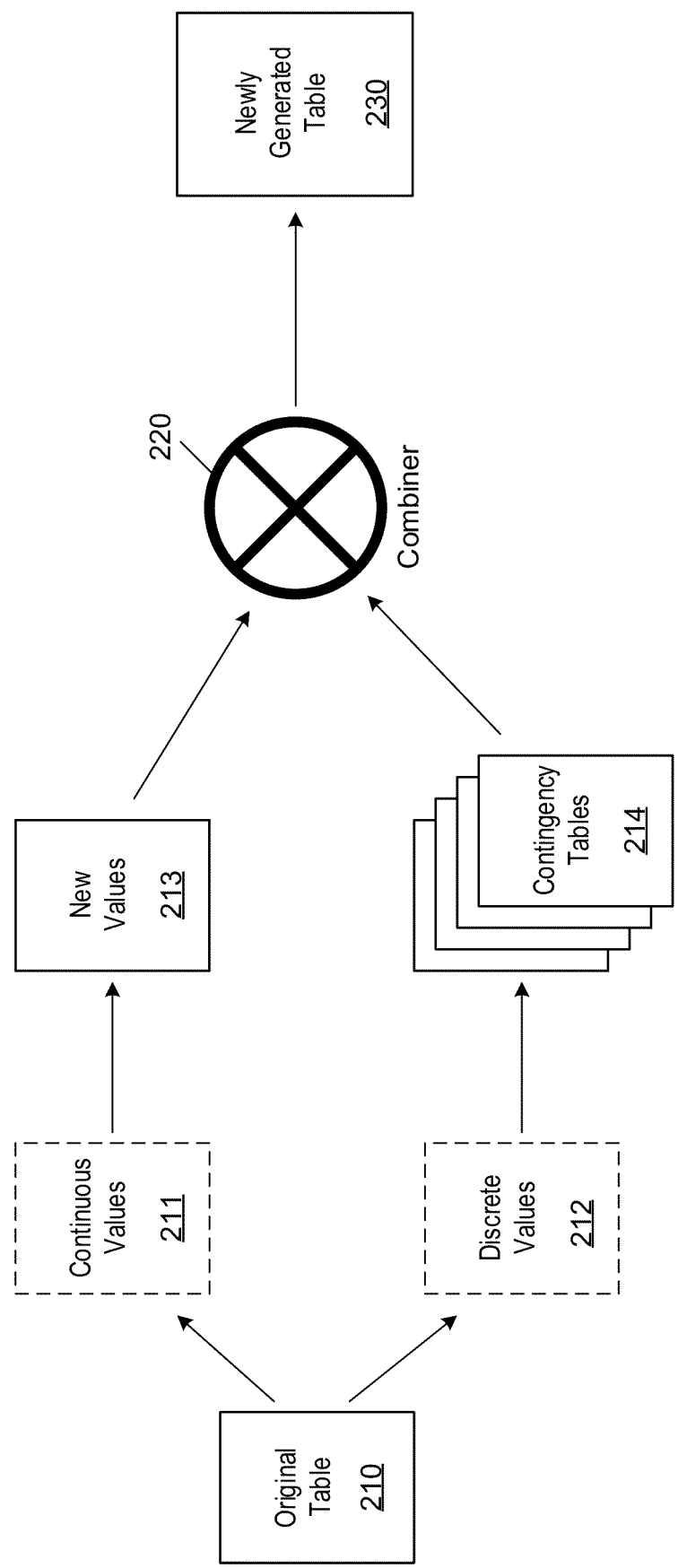

FIGS. 2A-2B illustrate a process of generating new data for a data set with multiple types of variables according to example embodiments. For example, FIG. 2A illustrates a process 215 of generating a new table of data 230 from an original table of data 210 based on the multi-variable data generation process according to the example embodiments. Furthermore, FIG. 2B illustrates a sequence of steps 240 that are included in the process shown in the example of FIG. 2A. Referring to FIGS. 2A and 2B, the original table 210, also referred to herein as an original data set, is used to generate a new data set that has similar patterns, characteristics, etc. as the original table. Here, the original table 210 includes both discrete values (e.g., where the value is a value selected from predefined choices) and continuous values (e.g., where the value can be any value within a range of values or interval, etc.)

According to various embodiments, in 241, an original data set such as the original table 210 is received. In 242, the system may divide the original data set 210 into two subsets of data including a subset of continuous data 211 and a subset of discrete data 212. The subset of continuous data 211 includes columns of data values that have a continuous-type of data value (e.g., floating point, numeric, decimal, etc.) while the subset of discrete data 212 includes columns of data values that have a discrete-type of data value (e.g., finite, numeric, integer that is countable). Here, the system may store the subset of continuous data 211 and the subset of discrete data 212 in a storage device such as a memory. The subset of continuous data 211 may include non-integer values that have decimal places, a value from among a range/interval of values, and/or the like.

In 243, the system may transform the subset of continuous data 211 into a second subset of discrete data values based on a combination of variable/dimension reduction and data binning which can be used to convert traditional decimal values/float values into discrete values that include a finite, numeric, value that is in integer form. An example of transforming data from continuous form to discrete form is shown and described with respect to FIG. 3B. In 244, the system may construct conditional contingency tables that include contingencies of discrete variables based on existing discrete values in the original data set. The conditional contingency tables may be generated based on the subset of discrete data 212 extracted from the original data set 210 and the discrete values transformed in step 243. The conditional contingency tables may include rearrangements of values from the original data set as well as new data or values 213, different data, and the like.

In 245, the system may generate a new continuous subset of data from the continuous subset of data 211. Here, the system may generate the continuous data using an existing data generation method. In 246, the continuous data may be combiner 220 with discrete data values from one or more of the contingency tables 214 to generate the new data table 230. The new data table 230 may be the same size as the original data table 210 with different values that are similar in pattern and characteristic as the original data values in the original data table 210.

Figure 3A:
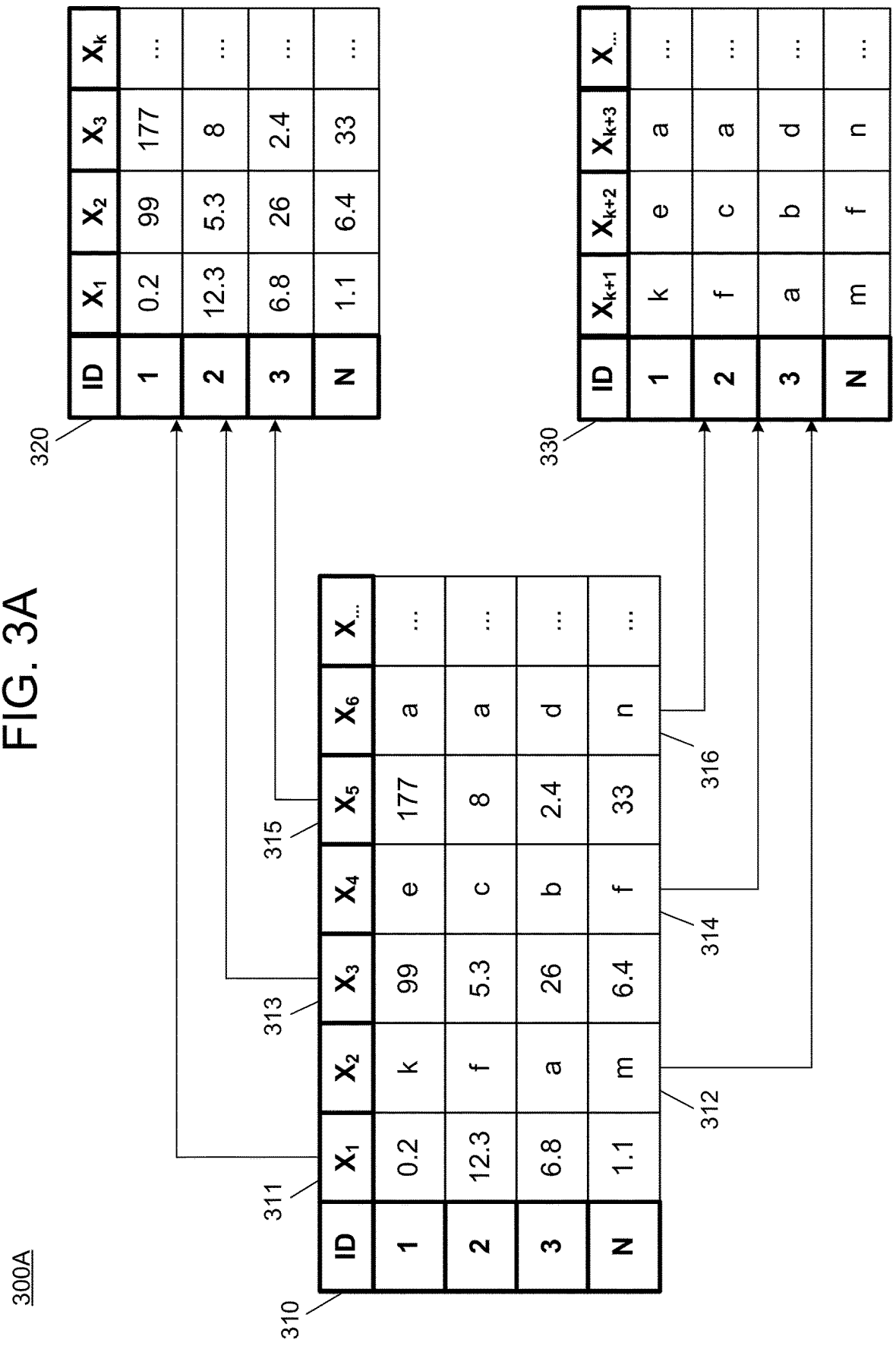

FIGS. 3A-3F illustrate processes for building contingency tables and using the contingency tables to generate new data according to example embodiments. For example, FIG. 3A illustrates a process 300A of splitting an original data set 310 into a first subset 320 and a second subset 330 based on data type of the values stored in the original data set 310. In this example, the original data set 310 includes a table with columns 311, 312, 313, 314, 315, and 316 filled with data values. Each column has its own data type stored therein. In this example, continuous-type data is stored within columns 311, 313, and 315, while discrete-type data is stored within columns 312, 314, and 316. Here, a continuous-type data value refers to data value that is continuous while a discrete-type data value refers to a data value that is discrete.

According to various embodiments, the system described herein may divide up the original data set 310 by columns. Here, the system may store the columns 311, 313, and 315 with continuous-type data values stored therein within the first subset 320 and the system may store the columns 312, 314, 316, with the discrete-type data values therein within the second subset 330. For example, the system may check a data type that is associated with each column using metadata within the table, etc.

Figure 3B:
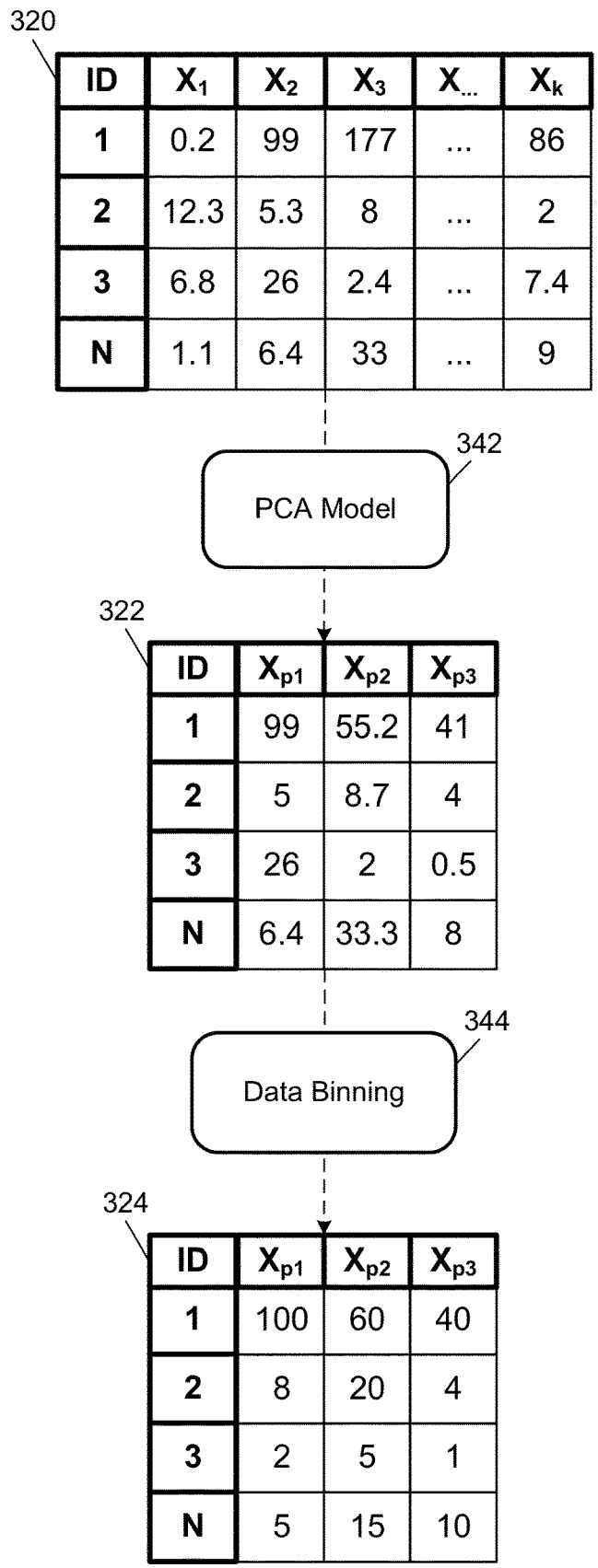

FIG. 3B illustrates a process 300B of converting the first subset 320 of continuous-type data values into a second subset 324 of discrete-type values in accordance with example embodiments. Here, the system may apply/execute a PCA algorithm 342 on the first subset 320 to reduce the number of columns within the first subset 320 to a dimensionally-reduced subset 322 based on similarity of values amongst the columns. Next, the system may execute a data binning operation 344 on the dimensionally-reduced subset 322 to generate the second subset 324 of discrete-type values.

Figure 3C:
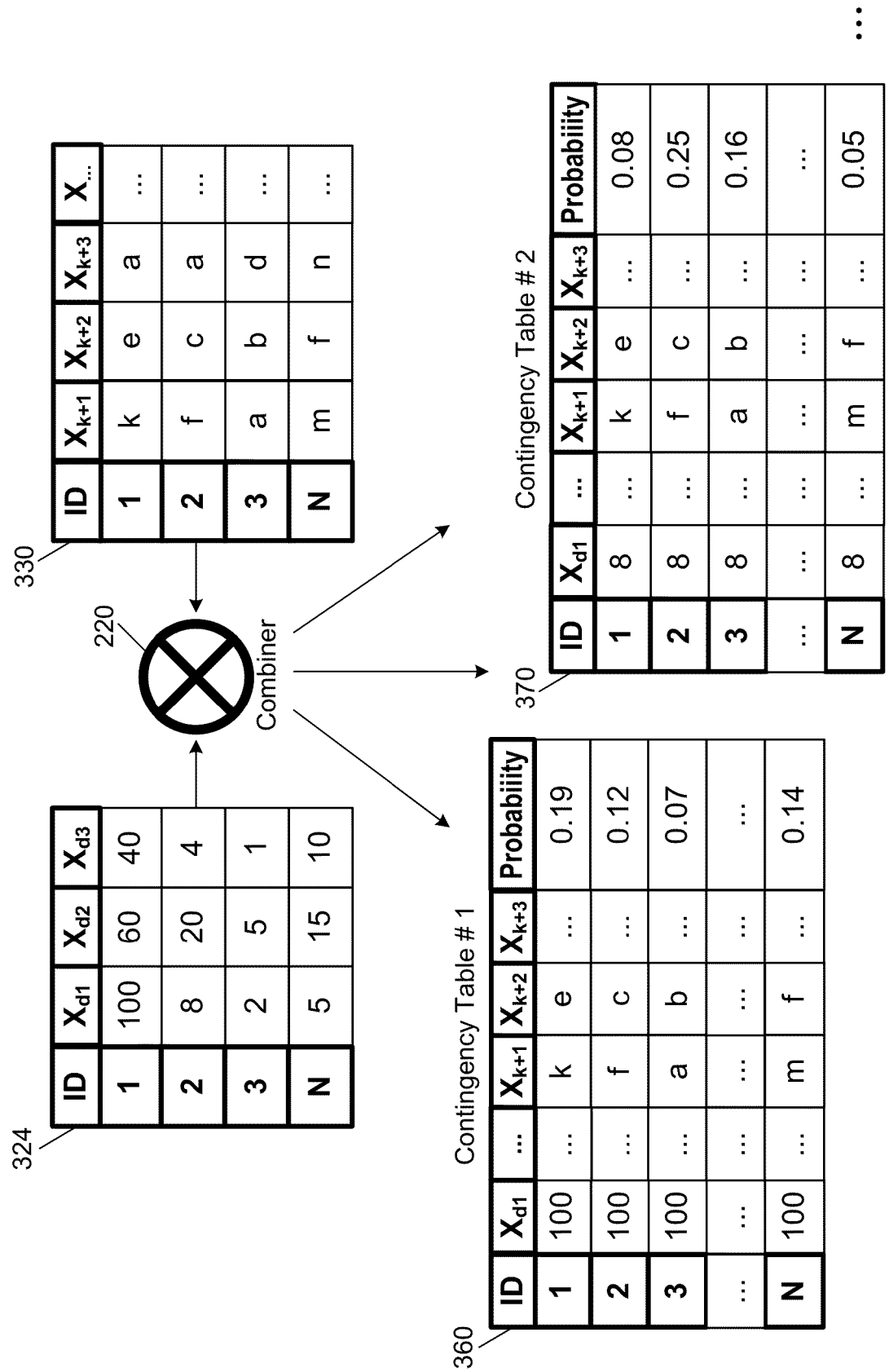

FIG. 3C illustrates a process 300C of generating a plurality of contingency tables including contingency table 360 and contingency table 370 based on the second subset 324 of discrete data values and the first subset 330 of discrete data values. Here, a combiner 220 may use a predefined algorithm to combine data from both of the second subset 324 of discrete data values and the first subset 330 of discrete data values. The combiner 220 may use a predefined algorithm. For example, the combiner 220 may select a first value from a first column the second subset 324 of discrete data values (i.e., the value '100') and select a subset of values from the first subset of discrete values to generate the conditional contingency table 360. Likewise, the combiner 220 may select a second value from a first column the second subset 324 of discrete data values (i.e., the value '8') and select a subset of values from the first subset of discrete values to generate the conditional contingency table 370. This process may iteratively repeat for all possible values in the first column, etc. Each of the entries in a conditional contingency table may also include a probability that is generated by the system, and which represents a likelihood of the entry being found in another conditional contingency table.

Figure 3D:
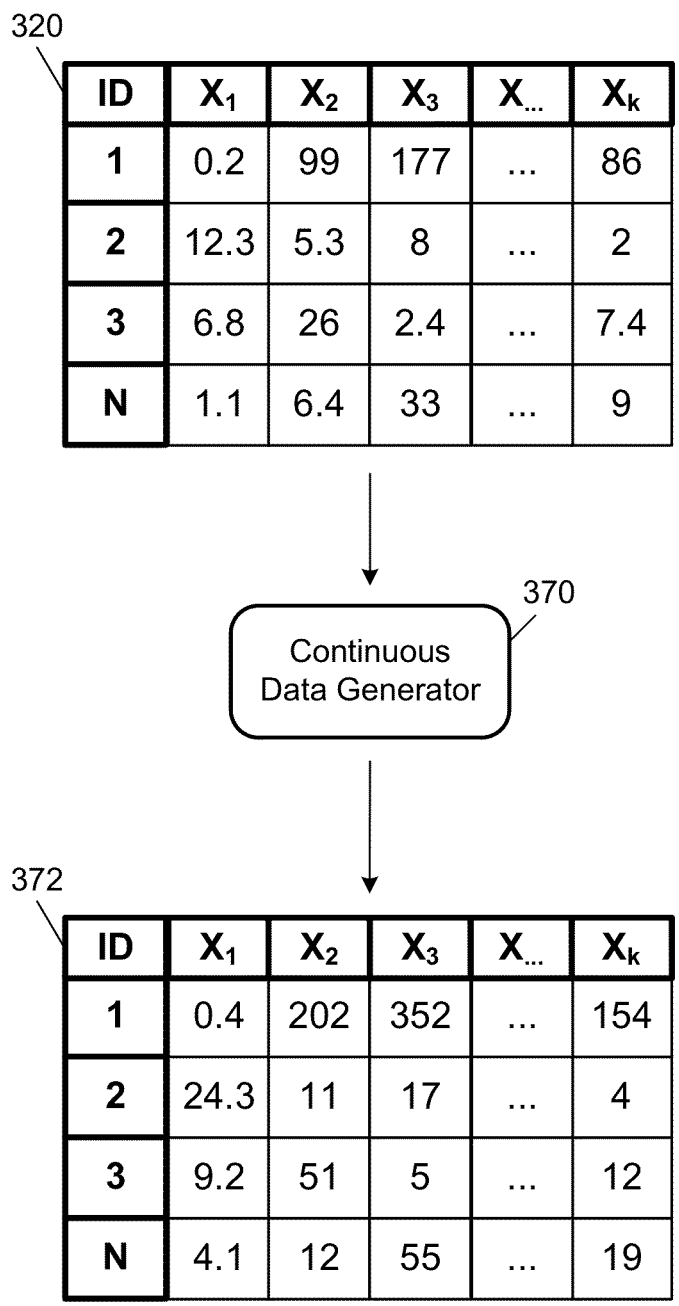

FIG. 3D illustrates a process 300D of generating a new continuous data set 372 based on execution of a continuous data-generator algorithm 370 on the first subset 320 of continuous data values. Here, the algorithm 370 may be any known in the art. FIG. 3E illustrates a process 300E of adding subsets of discrete values to the new continuous data set 372 to generate a new data set 380 with both continuous values already therein in columns 381, 382, 383, 384, and 385, and empty spaces in columns 386, 387, and 388 for discrete values therein that matches the original data set 310 in both characteristics and patterns. Here, a subset of data 362 from the conditional contingency table 360 is added/appended within columns 386, 387, and 388 of the new data set 380. FIG. 3F illustrates another process 300F of adding a subset of data 372 from the conditional contingency table 370 to the new data set 380.

FIG. 4 illustrates a process 400 of training a model 424 via an execution engine 422 hosted by a host platform 420 according to example embodiments. The model 424 may include a machine learning model, an AI model, and the like. Referring to FIG. 4, a host platform 420 may host an IDE 410 (integrated development environment) where models may be developed, trained, retrained, and the like. In this example, the IDE 410 may include a software application with a user interface accessible by a user device over a network or through a local connection. For example, the IDE 410 may be embodied as a web application that can be accessed at a network address, URL, etc by a device. As another example, the IDE 410 may be locally or remotely installed on a computing device used by a user.

The IDE 410 may be used to design the model 424 (via a user interface of the IDE). The model 424 may receive input and generate an output response which can be displayed on a user interface/dashboard of a software application that displays content during meetings between user devices. The model 424 can be executed/trained based on the training data established via the user interface. For example, the user interface may be used to build a new model. The training data for training such a new model may be provided from a training data store such as a database 430. The training data stored within the database 430 may include tables of data such as database tables with rows and columns of data. Furthermore, according to various embodiments, the training data stored within the database 430 may be generated based on the data generation methods described herein.

During training, the model 424 may be executed on training data (e.g., a newly-generated data record 432, etc.) via the execution engine 422 of the host platform 420. The training data including the newly-generated data record 432 may be queried from the database 430, vectorized if necessary, and executed by the model 424. The model 424 may learn patterns and the like within the data in the newly-generated data record 432. The trained model may be stored in a repository 426 where it can be retrieved for use at a subsequent time.

Figure 5A:
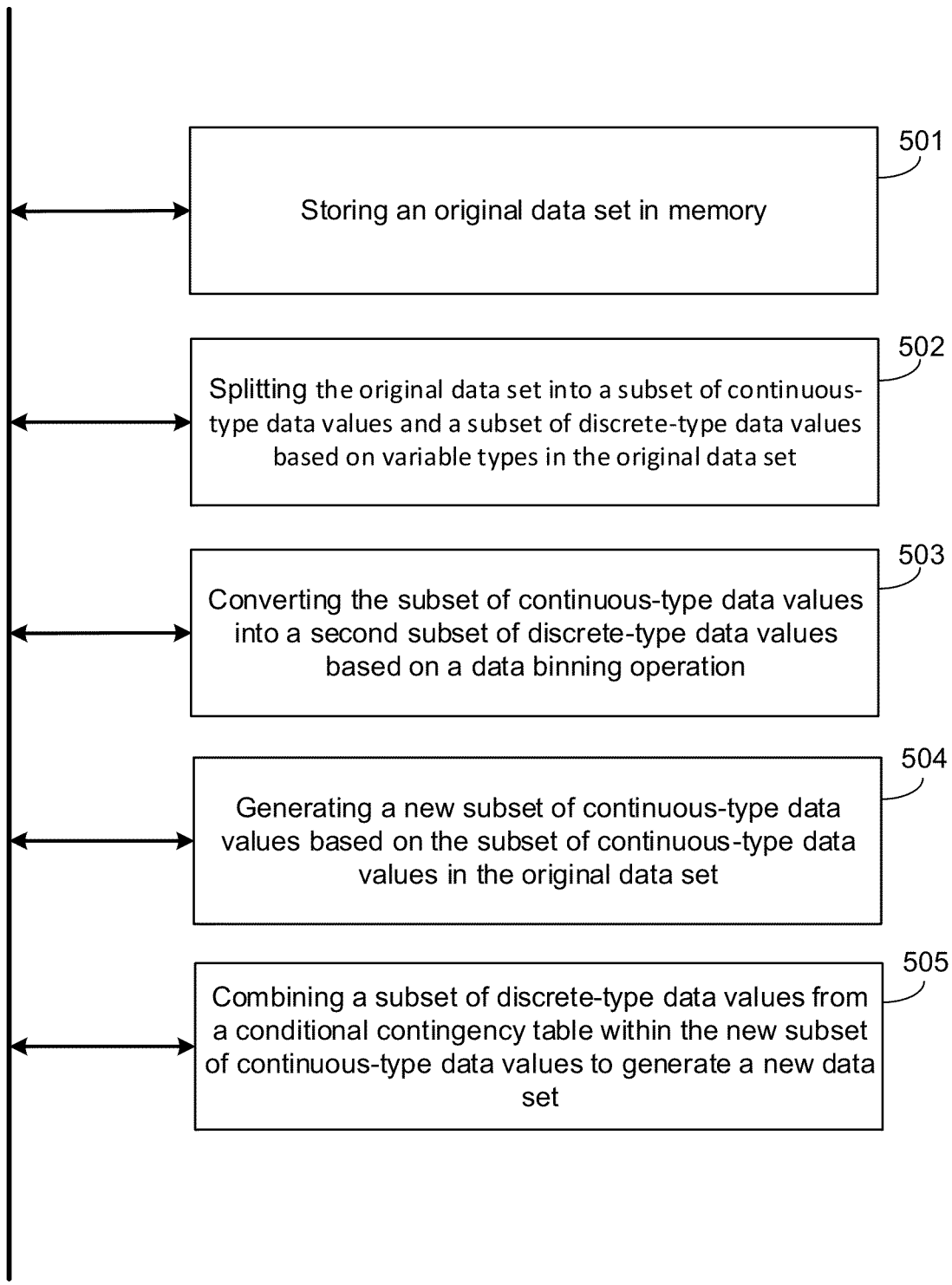
FIG. 5A is a diagram illustrating a method of generating new data from multi-variable data according to example embodiments.

FIG. 5A illustrates a method 500 of generating new data from multi-variable data according to example embodiments, and FIG. 5B illustrates a method 510 of generating new data from multi-variable data according to example embodiments. Referring to FIG. 5A, in 501, the method may include storing an original data set in memory. In 502, the method may include splitting the original data set into a subset of continuous-type data values and a subset of discrete-type data values based on variable types in the original data set. In 503, the method may include converting the subset of continuous-type data values into a second subset of discrete-type data values based on a data binning operation.

In 504, the method may include generating a new subset of continuous-type data values based on the subset of continuous-type data values in the original data set. In 505, the method may include combining a subset of discrete-type data values from a conditional contingency table within the new subset of continuous-type data values to generate a new data set.

Referring now to FIG. 5B, in some embodiments, in 511, the method may further include splitting the table into a subset of columns of the continuous-type data values and a second subset of columns of the discrete-type data values within the table. In 512, the method may further include generating a conditional contingency table that includes rows of data within the subset of columns of continuous-type data values that share a common value for one of the discrete-type data values. In 513, the method may further include determining a probability of each of the rows of data within the conditional contingency table being within a different conditional contingency table from among the plurality of conditional contingency tables, and adding the probability to each of the rows of data within the conditional contingency table.

In 514, the method may further include executing a principal analysis component (PCA) model on the subset of continuous-type data values to reduce a number of dimensions within the subset of continuous-type data values and executing the data binning operation on the reduced number of dimensions to generate the second subset of discrete-type data values. In 515, the method may further include generating a plurality of conditional contingency tables that include different subsets of discrete-type values from the second subset of discrete-type data values, and generating the new subset of continuous-type data values after the plurality of conditional contingency tables is generated. In 516, the method may further include executing a machine learning model on the new data set, determining a predictive performance of the machine learning model, and displaying the predictive performance via a user interface.

In another embodiment, a method may include one or more of storing an original data set, splitting the original data set into a subset of continuous-type data values and a subset of discrete-type data values based on variable types in the original data set, converting the subset of continuous-type data values into a second subset of discrete data values based on a data binning operation, generating a plurality of conditional contingency tables that include different subsets of discrete-type values from the second subset of discrete-type data values, generating a new subset of continuous-type data values based on the subset of continuous-type data values in the original data set, and selecting a conditional contingency table from among the plurality of conditional contingency tables and combining a subset of discrete-type data values from the selected conditional contingency table within the new subset of continuous-type data values to generate a new data set.

One embodiment provides a method for enhancing the efficiency and accuracy of training machine learning (ML) models. The method involves the utilization of a specialized data pre-processing module designed to refine the input data for an ML system, ensuring that the data is in an optimal format for learning.

The data pre-processing module operates by first categorizing the input data into various types based on their inherent characteristics, such as temporal, spatial, categorical, or numerical. Once categorized, a series of data transformation techniques are employed, specific to each data type. A Fourier transform may be applied for temporal data to extract significant frequency components. Spatial data may be processed through a convolution operation to emphasize structural elements, while categorical data could be encoded using one-hot encoding or similar techniques to facilitate easier pattern recognition by the ML model.

The module implements a novel data normalization approach following the categorization and initial processing. Unlike traditional normalization techniques that uniformly scale numeric data, the instant solution adapts the scaling based on the distribution characteristics of each data type. For example, data exhibiting a Gaussian distribution may be normalized differently than data with a bimodal distribution, enabling the ML model to better understand and learn from the unique patterns within the data.

The method further comprises a feature extraction process that employs advanced functionality to identify and select the most relevant features from the pre-processed data. This process uses a hybrid approach combining both supervised and unsupervised learning techniques to determine feature relevance, thereby reducing the data's dimensionality and enhancing the ML model's learning efficiency.

Another aspect of the embodiment involves the integration of a continuous feedback mechanism between the ML model and the data pre-processing module. This feedback allows the pre-processing module to adapt its parameters dynamically, optimizing the data transformation processes in real-time based on the performance of the ML model. Such a feedback loop ensures that the model receives consistently refined data for better training outcomes. The current embodiment may also include a model validation system that operates in parallel with the ML model training process. The validation system uses a portion of the pre-processed data to continually assess the accuracy of the model, providing insights into the model's performance and highlighting potential areas for improvement. This system is designed to be modular, allowing for easy integration with different types of ML models and architectures.

In a further embodiment of the instant solution, a robust computing system is provided, which facilitates the advanced generation and processing of synthetic datasets for the training of ML models in healthcare. This system specifically addresses the privacy concerns and data scarcity often encountered in medical data analysis. The computing system employs an innovative synthetic data generation engine (SDGE) that interfaces with a secure healthcare data repository containing sensitive patient information.

The SDGE incorporates a unique ensemble of functionality, including generative adversarial networks (GANs), differential privacy mechanisms, and domain-specific heuristics, to produce synthetic data that closely mirrors the statistical properties of the original healthcare datasets without compromising individual privacy. The generated synthetic data retains critical medical correlations and patterns necessary for the effective training of ML models.

The system includes a data verification module (DVM) that applies a series of domain-specific data validity checks to ensure that the synthetic data is of high quality and utility. For example, the DVM can verify that generated synthetic blood glucose levels are within medically plausible ranges and maintain realistic relationships with other variables such as medication dosage and patient weight.

For example, the computing system is configured to operate within hospital information systems. It integrates seamlessly with electronic health record (EHR) systems, receiving anonymized patient data, which it then uses as a basis for synthetic data generation. The system's interface is designed to be used by healthcare professionals, data scientists, and compliance officers, ensuring that the generated data adheres to regulatory standards such as HIPAA in the United States. The system features a model training and evaluation platform that utilizes synthetic data to train various ML models, such as those for predictive diagnostics, treatment recommendation systems, and patient readmission risk models. The platform includes a feedback loop where model performance metrics are analyzed to iteratively refine the synthetic data generation process, thus enhancing the relevancy and accuracy of the synthetic datasets over time.

The instant solution not only generates privacy-compliant synthetic data but also validates and iteratively improves this data through a closed-loop system that considers the performance of downstream ML models.

In one embodiment of the instant solution, an integrated computing system is presented for optimizing agricultural yield through precision farming. The system comprises a distributed network of interconnected nodes, referred to as the Agricultural Cloud Network (ACN), which is embedded within an agricultural environment. This ACN is designed to collect, process, and analyze vast data points from various sources, including satellite imagery, soil sensors, weather stations, and IoT-enabled agricultural machinery.

At the core of the ACN is a multi-variable data generation process (MVDGP), which synthesizes data to create highly accurate models of agricultural ecosystems. The MVDGP uses advanced functionality to process real-time data on soil moisture levels, nutrient content, plant health, and microclimate conditions to generate synthetic datasets that represent possible future states of the agricultural environment under different scenarios. These synthetic datasets are crucial for running predictive analytics to inform farming decisions such as crop rotation, irrigation scheduling, and fertilizer application.

For example, the ACN is equipped with an array of Edge Processing Units (EPUs), strategically placed throughout the farm. These EPUs perform on-site data processing to minimize latency, allowing for real-time agricultural decision-making. They can run lightweight versions of the MVDGP to produce immediate, actionable insights directly in the field. The ACN integrates a Dynamic Model Training Module (DMTM) that continuously trains and refines predictive models based on both historical and freshly generated synthetic data. The DMTM leverages the synthetic data to enhance the models' accuracy, particularly in forecasting pest outbreaks, predicting crop diseases, and optimizing harvest timing. The instant solution employs real-time generation of synthetic data that is immediately applicable to day-to-day agricultural management, a process that traditionally relies on historical data and often results in delayed decision-making. The embodiment's integration of the ACN with EPUs and DMTM introduces a novel approach to precision farming, where decisions are informed by predictive analytics that simulate future conditions rather than solely relying on reactive strategies.

This embodiment could be implemented by agricultural technology firms, cooperative farming groups, and independent farmers to enhance crop yields, reduce waste, and increase overall farm efficiency. By leveraging the interconnected components of the invention, the ACN provides a scalable and adaptable solution for the agricultural industry to address the challenges of food security and sustainability.

In one embodiment of the instant solution, a financial analytics service is presented by a cloud-based platform. This service is aimed at enabling banks to predict loan defaults based on historical customer data. The platform utilizes a Central Processing Service (CPS) for orchestration and Distributed Processing Units (DPUs) for data handling and computations, which are connected via a secure cloud network.

The CPS, powered by a high-throughput, multicore server-grade CPU, initiates the process by sending a message to the data storage system to retrieve the original dataset, which includes customer demographics, credit history, transaction records, and loan repayment statuses. The data storage system, which is a high-availability cluster with in-memory data grids for fast access, receives this message and responds by loading the requested dataset into the active memory for processing.

The CPS issues a command to the DPUs to begin splitting the dataset. Each DPU, equipped with a capable processor designed for parallel data processing tasks, receives a subset of the original dataset. The DPUs analyze their respective subsets, categorizing the data into continuous-type (e.g., income levels, loan amounts) and discrete-type (e.g., marital status, education level) values, and then send an acknowledgment back to the CPS confirming the completion of this task.

For the conversion of continuous data into discrete data, the CPS dispatches a binning functionality along with parameters to the DPUs. The DPUs execute this functionality, transforming continuous variables such as income into binned categories (e.g., low, medium, and high income). Each DPU processes its data segment concurrently and sends a message back to the CPS with metadata describing the transformation upon completion.

The generation of conditional contingency tables is then orchestrated by the CPS, which sends out instructions to the DPUs to construct these tables from the binned data. The DPUs perform this task, creating multiple contingency tables that reflect the relationships between various discrete data points and then transmitting them back to the CPS, consolidating them into a comprehensive model.

The CPS directs the DPUs to generate a new subset of continuous data based on the original values, using statistical modeling techniques to predict future loan repayment probabilities. After the DPUs generate this new data, it is combined with the selected contingency tables, as instructed by the CPS, to create an enriched dataset. This new dataset is sent back to the CPS, which then stores it in the data repository for subsequent access and analysis.

In one embodiment, the instant solution is utilized in an enterprise resource planning (ERP) system for a manufacturing company that aims to optimize its supply chain efficiency. The instant solution integrates a Central Data Management Server (CDMS) with several Operational Data Processors (ODPs) distributed across different manufacturing units. The CDMS, functioning on a high-capacity, multicore processing unit, initiates the enablement process by dispatching a request to the manufacturing units' databases for the retrieval of the original dataset, which may include inventory levels, production rates, material costs, and shipment schedules. These databases, running on dedicated servers optimized for high I/O throughput and data integrity, respond by sending the requested tables containing the relevant continuous and discrete data values back to the CDMS. Upon receiving the datasets, the CDMS issues a directive to the ODPs to commence the splitting operation. Each ODP, equipped with a robust CPU that is adept at handling complex data operations, receives a portion of the dataset. The ODPs then proceed to categorize the data into subsets of columns with continuous data values (like material costs) and discrete data values (such as shipment schedules) based on the variable types indicated in the dataset schema. They send back a confirmation message to the CDMS once the splitting is complete.

The CDMS, after receiving the confirmations, sends out further instructions to the ODPs to apply the designated binning operations to the continuous data subsets. These operations involve categorizing continuous data into discrete bins to simplify the analysis—for example, material costs could be binned into low, medium, and high-cost categories.

After the binning operation, the ODPs generate the conditional contingency tables as instructed by the CDMS. These tables map the relationships between different discrete data types post-binning, which are crucial for predictive analytics in the supply chain context. The ODPs then transmit these tables back to the CDMS for consolidation and further analysis.

Finally, the CDMS combines the received conditional contingency tables with the new subset of continuous data values. This enriched dataset is then used for predictive modeling, providing insights into potential supply chain bottlenecks, and helping to streamline operations. The CDMS sends a message confirming the successful integration of the tables to the ODPs and makes the new dataset available for supply chain managers through the ERP system interface.

The CDMS, with its powerful processing capabilities, serves as the command center, while the ODPs, positioned closer to the data sources, perform the data processing tasks, and provide quick feedback to the CDMS. This structure enables the system to efficiently process large datasets, reduce the complexity of the data, and enhance the decision-making process in the manufacturing company's supply chain management.

In one embodiment, a system designed for traffic management within a smart city infrastructure is considered. The system comprises a Central Traffic Data Server (CTDS) and a network of Edge Traffic Processors (ETPs) located at various traffic signal control centers throughout the city. The CTDS, powered by a server-grade multicore processor capable of handling large-scale data analytics, sends a retrieval request to the traffic signal databases for access to the original dataset. This dataset includes continuous-type data values such as vehicle flow rates and speed and discrete-type data values like traffic light states and incident reports. The traffic signal databases, which are maintained on high-availability storage systems with processors optimized for real-time data transactions, respond by transferring the datasets to the CTDS.

Upon receiving the datasets, the CTDS dispatches an instruction to the ETPs to execute the data splitting operation. Each ETP, equipped with specialized processors designed for low-latency data processing and capable of executing localized decision-making functionality, receives a segment of the dataset. The ETPs analyze the data, separating it into columns of continuous and discrete data types based on pre-defined criteria that distinguish between the two data value types, and then acknowledge the completion of this task to the CTDS.

The CTDS then instructs the ETPs to generate conditional contingency tables that will reflect the probabilities of certain traffic patterns given the discrete data values. The ETPs create these tables by aggregating data from similar traffic conditions and determining the likelihood of various traffic flow scenarios. These contingency tables are then sent back to the CTDS, which consolidates the information received from multiple ETPs across the city.

This system enables the CTDS to model and predict traffic conditions with greater accuracy, leading to optimized signal timing and improved traffic flow management. In this case, the CTDS acts as the central orchestrator, while the ETPs are the frontline processors that handle the immediate data processing tasks.

A predictive maintenance system for industrial equipment within a manufacturing facility is considered in one embodiment. The system comprises a Central Analytics Processing Unit (CAPU) and multiple Equipment Data Processing Nodes (EDPNs) located at various manufacturing points, interfacing directly with the equipment sensors and controllers. The CAPU, which operates on a high-performance, multi-core processor capable of sophisticated data analytics and ML tasks, initiates the enablement process by sending a query to the EDPNs to collect the original dataset. This dataset consists of continuous-type data values like equipment vibration frequencies, temperatures, operating speeds, discrete-type data values such as on/off status, maintenance logs, and error codes. The EDPNs, which are equipped with ruggedized processors designed for industrial environments and capable of pre-processing sensor data, respond by transmitting the real-time equipment data to the CAPU. Once the CAPU has received the equipment data, it dispatches a set of instructions to the EDPNs to commence the data categorization process. The EDPNs process the data, categorizing it into subsets of columns with continuous data values (e.g., vibration frequencies and temperatures) and discrete data values (e.g., on/off status and maintenance logs), and then send a message back to the CAPU confirming the completion of this task.

Following this, the CAPU sends a message back to the EDPNs with functionality for generating a conditional contingency table based on the subset of discrete data values. The EDPNs execute this functionality, which involves calculating the probability of occurrence of each discrete data value in relation to other discrete values, a key step for identifying patterns that could indicate potential equipment failures. These probabilities are included as additional data points in the conditional contingency table, which are then sent back to the CAPU for further analysis.

The CAPU, acting as the central command, consolidates the conditional contingency tables received from the various EDPNs and utilizes them to refine predictive models for equipment maintenance.

The CAPU and the EDPNs are in constant communication; the CAPU sends commands, and the EDPNs respond with data and confirmations. This exchange allows for the dynamic processing and analysis of equipment data, enabling the predictive maintenance system to operate effectively and to provide actionable insights to the maintenance team.

A consumer behavior analysis system for a large online retailer is presented in one embodiment. This instant solution consists of a Central Analysis Server (CAS) and a series of Data Analysis Nodes (DANs) designed for high-speed data processing. The CAS, equipped with a scalable, multi-processor architecture, orchestrates the data analysis workflow, and communicates with the DANs, which are each outfitted with high-frequency CPUs optimized for data mining and ML tasks. The process begins with the CAS sending a retrieval request to the retailer's transactional database servers to access the original dataset, which includes continuous-type data such as time spent on each page, prices of items, and the number of items purchased, along with discrete-type data such as item categories and user ratings. These database servers, running on powerful processors with fast memory access, respond by transferring the requested data to the CAS. Upon receiving the dataset, the CAS dispatches a directive to the DANs to perform Principal Component Analysis (PCA). The PCA operation is designed to reduce the dimensionality of the continuous data, simplifying the dataset while preserving its statistical properties. The DANs, upon receiving the instruction, execute the PCA model and then apply a data binning operation to transform the reduced continuous data into discrete data values, which are categorized into meaningful intervals or bins.

Each DAN processes its allocated segment of the dataset and communicates the resulting binned data back to the CAS upon completion. The message sent from each DAN contains details of the transformation process, including the new discrete values and their corresponding intervals.

The CAS, acting as the central processing hub, receives these messages from the DANs and integrates the newly binned data with the original discrete data values. This integrated dataset is then used to generate insights into consumer behavior, such as identifying purchasing patterns and predicting future sales trends. In the current embodiment, the CAS leverages its multi-processor capability to coordinate the analysis workflow, while the DANs utilize their data processing power to perform PCA and binning operations efficiently. The communication between the CAS and the DANs ensures that the data analysis is both comprehensive and scalable, allowing the online retailer to adapt quickly to changing consumer behaviors and market conditions.

A Data Compilation and Analysis System (DCAS) interfacing with Clinical Data Processors (CDPs) at various trial sites is presented in one embodiment. The DCAS, which operates on a multi-core, high-performance central processing unit (CPU) capable of complex analytical computations and data synthesis, initiates the data analysis process by sending out a request to all CDPs for the collection of patient clinical trial data. This data comprises both continuous variables, such as dosage levels and biometric readings, and discrete variables, like genetic markers and the presence or absence of specific symptoms. The CDPs, powered by reliable and secure processors designed for medical data collection and preliminary analysis, respond by transmitting the requested datasets to the DCAS. When the datasets are received, the DCAS issues a command to the CDPs to initiate the creation of conditional contingency tables. Each CDP, handling its portion of the data, starts to compile tables that associate the probability of clinical outcomes with various discrete variables. For example, a contingency table might correlate the efficacy of a medication with a specific genetic marker present within a subset of trial participants. As part of this instant solution, each CDP calculates probabilities for the occurrences of clinical outcomes based on the shared common values for discrete data types across different patient datasets. These probabilities are integral to the clinical trial as they help identify potential correlations or causations. After the calculations, each CDP sends a message back to the DCAS containing the constructed conditional contingency tables along with the associated probabilities for each row of data.

The DCAS, upon receiving these contingency tables, integrates them into a comprehensive model that helps in the predictive analysis of the clinical trial outcomes. The research analysts can then utilize this integrated model to determine the efficacy of treatment protocols and make informed decisions about the next phases of the clinical trials. In the current embodiment, the DCAS acts as the orchestrator, sending out requests and processing instructions, while the CDPs serve as the executors of the specific data processing tasks. The messages exchanged between the DCAS and the CDPs involve data requests, processing commands, and confirmations, enabling a seamless workflow that optimizes the analysis of clinical trial data for future treatment improvements.

In one embodiment, an e-commerce recommendation system is presented, managed by a Cloud-Based Analytics Server (CBAS), and connected to multiple Data Processing Units (DPUs) spread across various data centers. The CBAS has a robust, scalable processor architecture designed for data-intensive ML tasks, while the DPUs are equipped with processors that specialize in rapid data transformation and analysis. The CBAS initiates the process by dispatching a request to the e-commerce platform's transactional database, seeking to retrieve an original dataset that includes continuous-type data such as customer dwell time on product pages and purchase amounts and discrete-type data like product categories and customer reviews. The database, operating on a high-availability server with a multi-threaded processor, responds by transmitting the detailed transactional records to the CBAS for further processing. Upon receiving the dataset, the CBAS sends a series of instructions to the DPUs to perform data splitting. Each DPU, utilizing a processor capable of parallel data operations, segregates the dataset into continuous and discrete subsets. After sorting the data, the DPUs generate new subsets of continuous data values based on statistical modeling techniques and report the completion of these tasks back to the CBAS.

The CBAS instructs the DPUs to conduct a Principal Component Analysis (PCA) on the subset of continuous data values to reduce dimensionality. The DPUs apply the PCA model and then perform a data binning operation on the dimensionally reduced data to convert it into a discrete format. The results of these operations are sent back to the CBAS in a structured format ready for further analysis. The CBAS executes an ML model on the new dataset to determine predictive performance. It utilizes the discrete and continuous data subsets to train the model, assessing its accuracy in predicting customer behavior and product preferences. The performance metrics, derived from the ML model's execution, are compiled into a report by the CBAS. The CBAS sends a message to the e-commerce platform's user interface, detailing the predictive performance of the recommendation system. This message includes a summary of the performance metrics, which may be displayed on a dashboard accessible by the e-commerce platform's analytics team. The user interface, supported by a web server with a processor optimized for serving dynamic content, may receive the performance report and updates the dashboard in real time. In the current embodiment, the CBAS is responsible for coordinating the overall predictive analysis process, while the DPUs handle the computational tasks related to data transformation and ML model training.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
a memory configured to store an original data set; and
a processor configured to:
split the original data set into a subset of continuous-type data values and a subset of discrete-type data values based on variable types in the original data set,
convert the subset of continuous-type data values into a second subset of discrete-type data values based on a data binning operation,
generate a new subset of continuous-type data values based on the subset of continuous-type data values in the original data set, and
combine a subset of discrete-type data values from a conditional contingency table within the new subset of continuous-type data values to generate a new data set.

2. The apparatus of claim 1, wherein the original data set comprises a table, and
the processor is configured to:
split the table into a subset of columns of the continuous-type data values and a second subset of columns of the discrete-type data values within the table.

3. The apparatus of claim 2, wherein the processor is configured to:
generate a conditional contingency table that includes rows of data within the subset of columns of continuous-type data values that share a common value for one of the discrete-type data values.

4. The apparatus of claim 3, wherein the processor is configured to:
determine a probability of each of the rows of data within the conditional contingency table being within a different conditional contingency table from among a plurality of conditional contingency tables, and
add the probability to each of the rows of data within the conditional contingency table.

5. The apparatus of claim 1, wherein the processor is configured to:
execute a principal analysis component (PCA) model on the subset of continuous-type data values to reduce a number of dimensions within the subset of continuous-type data values, and
execute the data binning operation on the reduced number of dimensions to generate the second subset of discrete-type data values.

6. The apparatus of claim 1, wherein the processor is configured to:
generate a plurality of conditional contingency tables that include different subsets of discrete-type values from the second subset of discrete-type data values, and
generate the new subset of continuous-type data values after the plurality of conditional contingency tables is generated.

7. The apparatus of claim 1, wherein the processor is configured to:
execute a machine learning model on the new data set,
determine a predictive performance of the machine learning model, and
display the predictive performance via a user interface.

8. A method comprising:
storing an original data set in memory;
splitting the original data set into a subset of continuous-type data values and a subset of discrete-type data values based on variable types in the original data set;
converting the subset of continuous-type data values into a second subset of discrete-type data values based on a data binning operation;
generating a new subset of continuous-type data values based on the subset of continuous-type data values in the original data set; and
combining a subset of discrete-type data values from a conditional contingency table within the new subset of continuous-type data values to generate a new data set.

9. The method of claim 8, wherein the original data set comprises a table, and
the splitting comprises splitting the table into a subset of columns of the continuous-type data values and a second subset of columns of the discrete-type data values within the table.

10. The method of claim 9, wherein the method further comprises:
generating a conditional contingency table that includes rows of data within the subset of columns of continuous-type data values that share a common value for one of the discrete-type data values.

11. The method of claim 10, wherein the method further comprises:
determining a probability of each of the rows of data within the conditional contingency table being within a different conditional contingency table from among a plurality of conditional contingency tables; and
adding the probability to each of the rows of data within the conditional contingency table.

12. The method of claim 8, wherein the method further comprises:
executing a principal analysis component (PCA) model on the subset of continuous-type data values to reduce a number of dimensions within the subset of continuous-type data values; and
executing the data binning operation on the reduced number of dimensions to generate the second subset of discrete-type data values.

13. The method of claim 8, wherein the method further comprises:
generating a plurality of conditional contingency tables that include different subsets of discrete-type values from the second subset of discrete-type data values; and
generating the new subset of continuous-type data values after the plurality of conditional contingency tables is generated.

14. The method of claim 8, wherein the method further comprises:
- executing a machine learning model on the new data set;
- determining a predictive performance of the machine learning mode; and
- displaying the predictive performance via a user interface.

15. A computer-readable storage medium comprising instructions that, when executed by a processor, cause the processor to perform:
- storing an original data set in memory;
- splitting the original data set into a subset of continuous-type data values and a subset of discrete-type data values based on variable types in the original data set;
- converting the subset of continuous-type data values into a second subset of discrete-type data values based on a data binning operation;
- generating a new subset of continuous-type data values based on the subset of continuous-type data values in the original data set; and
- combining a subset of discrete-type data values from a conditional contingency table within the new subset of continuous-type data values to generate a new data set.

16. The computer-readable storage medium of claim 15, wherein the original data set comprises a table, and the splitting further comprises:
- splitting the table into a subset of columns of the continuous-type data values and a second subset of columns of the discrete-type data values within the table.

17. The computer-readable storage medium of claim 16, wherein the instructions further cause the processor to perform:
- generating a conditional contingency table that includes rows of data within the subset of columns of continuous-type data values that share a common value for one of the discrete-type data values.

18. The computer-readable storage medium of claim 17, wherein the instructions further cause the processor to perform:
- determining a probability of each of the rows of data within the conditional contingency table being within a different conditional contingency table from among a plurality of conditional contingency tables; and
- adding the probability to each of the rows of data within the conditional contingency table.

19. The computer-readable storage medium of claim 15, wherein the instructions further cause the processor to perform:
- executing a principal analysis component (PCA) model on the subset of continuous-type data values to reduce a number of dimensions within the subset of continuous-type data values; and
- executing the data binning operation on the reduced number of dimensions to generate the second subset of discrete-type data values.

20. The computer-readable storage medium of claim 15, wherein the instructions further cause the processor to perform:
- generating a plurality of conditional contingency tables that include different subsets of discrete-type values from the second subset of discrete-type data values; and
- generating the new subset of continuous-type data values after the plurality of conditional contingency tables is generated.

* * * * *